United States Patent
Okude et al.

(10) Patent No.: US 6,324,469 B1
(45) Date of Patent: Nov. 27, 2001

(54) THREE-DIMENSIONAL MAP DRAWING METHOD AND NAVIGATION APPARATUS

(75) Inventors: Mariko Okude, Hitachi; Yoshinori Endo, Mito; Hideo Hiroshige, Hitachi; Kozo Nakamura, Hitachioota, all of (JP)

(73) Assignees: Hitachi, Ltd., Tokyo; Xanavi Informatics Corporation, Zama, both of (JP)

( * ) Notice: Subject to any disclaimer, the term of this patent is extended or adjusted under 35 U.S.C. 154(b) by 0 days.

(21) Appl. No.: 09/527,564

(22) Filed: Mar. 16, 2000

(30) Foreign Application Priority Data

Mar. 16, 1999 (JP) .................................................. 11-069959

(51) Int. Cl.[7] .................................................. G01C 21/00
(52) U.S. Cl. .......................... 701/208; 701/211; 340/990; 345/423; 345/441
(58) Field of Search .................................. 701/208, 211, 701/200; 340/990, 995, 988; 345/423, 441, 442

(56) References Cited

U.S. PATENT DOCUMENTS

| | | | | |
|---|---|---|---|---|
| 5,974,876 | * | 11/1999 | Hijikata et al. | 73/178 R |
| 6,130,673 | * | 10/2000 | Pulli et al. | 345/428 |
| 6,137,492 | * | 10/2000 | Hoppe | 345/420 |
| 6,148,090 | * | 11/2000 | Narioka | 382/113 |

* cited by examiner

Primary Examiner—Olga Hernandez
(74) Attorney, Agent, or Firm—Crowell & Moring LLP

(57) ABSTRACT

Whether the structure data read from the map data correspond to a non-decomposition structure or a decomposition structure, the drawing attribute of the mesh boundary is modified for the decomposition structure, and textures such as windows are mapped on the side wall of the structure by mapping the texture on the side wall of the structure reconstructed after reconstructing the single-bodied structure before decomposition, or mapping the texture progressively on the side wall of the decomposition structure with the stored start point and end point of the texture to be mapped.

16 Claims, 13 Drawing Sheets

THREE-DIMENSIONAL MAP DRAWING METHOD AND NAVIGATION APPARATUS

BACKGROUND OF THE INVENTION

The present invention relates to map display technology, especially to three-dimensional map display method which is useful for applying to a navigation apparatus for displaying roads and buildings around the driving vehicle and near the cross way as three-dimensional images in a perspective map viewed in a designated angle with respect to the ground surface.

In the present invention, the term designated as structure represents structural objects, buildings, road and railways comprising the map. The term designated as decomposition structure represents a single structure existing on the plural mesh regions defined in the map data base and formed as a set of decomposed units each corresponding to the individual mesh regions, and the term designated as non-decomposition structure represents a single structure located and bound within a single mesh region.

Such a navigation apparatus is well known as an apparatus which supports the driver by displaying maps containing buildings and roads on a display screen by reading the digital map data stored on a memory device such as CD-ROM and DVC, and displaying the present position of the driving vehicle detected by the position detection sensor and the navigation guidance to the driver's designation location on the map.

In the recent map data in which street maps are stored, the detail information such as shapes, positions and the number of floors of residential houses and buildings can be displayed on the navigation apparatus. In addition, there is such an apparatus as using a method for displaying the buildings for providing landmark information in a three-dimensional view in the detail map information in order to present maps around the driving vehicle, the destination location and the cross way to be visited along the driving visually in more familiar manner.

The map data store the map information containing roads and buildings as decomposed meshes with designated intervals for the latitude and the longitude. As, in this kind of map data, the map information regarding the roads and buildings existing on the mesh boundaries is stored as plural sets of information decomposed by the mesh boundaries, there is such a problem that mesh boundary lines are displayed and super positioned on the structures such as residential houses and buildings existing on the mesh boundaries in the conventional method in which the map is displayed by reading the map data mesh by mesh.

As, In case of mapping textures such as windows on the side wall of the decomposed structure, the mapped textures are displayed discontinuously at the mesh boundaries, the mesh boundaries are displayed more explicitly than the case of displaying the map in a two-dimensional view, which results in the unexpected image for the user attempting to recognize the actual structures, and even leads to such a problem that the primitive objective for presenting the informative navigation guidance map in a familiar manner with three-dimensional view may not be attained.

SUMMARY OF THE INVENTION

An object of the present invention is to provide a navigation method for reducing the discontinuous drawing of the structure due to the existence of the mesh boundaries and providing realistic townscape images, a navigation apparatus for executing this method, and a map data providing a structure good for this method, in a navigation apparatus for reading a map information including roads and buildings decomposed by the mesh boundaries from the map data base and displaying a three-dimensional townscape viewed from a designated view point.

In order to achieve the above object, the present invention is characterized as a map display method in which a map is decomposed into a mesh area having a predefined size, and from a map data base storing an information representing a structure existing on an individual mesh area with respect to said individual mesh area, an information representing said structure is read in, and a perspective map viewed in a predefined angle with respect to a ground surface is displayed with a coordinate transformation, comprising a decomposition structure drawing step for drawing a single-bodied structure before decomposition by using an information defined when a structure originally formed as a single body existing over plural mesh areas of said map data base is decomposed for individual mesh areas, and representing a structure (hereinafter referred to as decomposition structure) stored so as to correspond to each of said plural mesh areas; a non-decomposition structure drawing step for drawing a structure (hereinafter referred to as non-decomposition structure) which does not exist over plural mesh areas; and an identifying step for identifying whether said structure information read from said map data base corresponds to said decomposition structure, wherein said decomposition structure drawing step uses plural sets of structure information originated from an identical single-bodied structure before decomposition which is judged to correspond to said decomposition structure by said identifying step, and draws plural decomposition structure corresponding to said plural sets of structure information as a unified body so as to reconstruct said single-bodied structure before decomposition.

In the decomposition structure drawing structure, it is allowed to configure the method, for example, in such a structure that (a) a closing line other than the closing line on the mesh area boundary (hereinafter referred to as tangential line) in the closing lines of the side wall of the decomposition structure is drawn, (b) the tangential line on the mesh area boundary is drawn with color, line style and pattern defined to be transparent color, identical to the color of the side wall of the structure, tint lines or broken lines so that the tangential line may not be seen distinctly, (c) the structure data are reconstructed and drawn with the points not located on the mesh area boundary and the points as defined as the end points of the structure and located on the mesh area boundary, or (d) the drawing start position and end position for the pattern are revised so that the pattern for the window and such to be drawn on the sidewall of the structure may looks continuous at the mesh boundary.

In order to achieve the above object, the present invention is characterized as a navigation apparatus having at least a means for reading a map information from a map data base storing a map information of a structure in terms of a decomposed mesh having a predefined size and displaying in a three-dimensional view, comprising a couple of drawing means for drawing a decomposition structure formed by decomposing a single-bodied structure existing over plural mesh areas and a non-decomposition structure which does not exist over plural mesh areas; and an identifying means for identifying whether structure data contained in said structure information read from said map data base corresponds to said decomposition structure, wherein said drawing means for drawing a decomposition structure uses plural sets of structure data originated from an identical single-bodied structure before decomposition among structure data which are judged to correspond to said decomposition structure by said identifying means, and draws plural decomposition structures corresponding to said structure data as a unified body so as to reconstruct said single-bodied structure.

In order to achieve the above object, the present invention is characterized as a storage medium used for displaying a map by a computer and storing a map data containing a map information formed in terms of a decomposed mesh having a designated size, wherein said map data stores structure data corresponding to a decomposition structure formed by decomposing a originally single-bodied structure existing over plural mesh areas in terms of a mesh area; structure data corresponding to a non-decomposition structure existing on a single mesh area; and identification data used for identifying whether each of said structure data corresponds to said decomposition structure.

The map data may be configured so as to store the link data link data for linkage among plural structures corresponding to plural decomposition structure originated from an identical single-bodied structure before decomposition, or decomposition point identification data for identifying whether each of a set of points for defining a shape of said decomposition structure is a decomposition point defined newly by a decomposition step in terms of said mesh area. It may be allowed that, in the map data, the structure data of the decomposition structure originated from an identical singe-bodied structure before decomposition existing outside the mesh area are stored in the data for the mesh area.

In the above described individual implementation of the present invention, though it is assumed that the present invention is applied to the decomposition structure decomposed at the boundary between adjacent mesh areas in the map data, the applicable scope of the present invention is not limited to this. For example, by means of applying the present invention to the decomposition structure formed in case that the originally single-bodied structure is decomposed with its interpolating points, as in the case with the decomposition structure decomposed at the mesh boundary as described above, it will be appreciated that a display method which reduce a discontinuous drawing of the structure due to the interpolated point at the boundary, a navigation apparatus executing this method and the map data providing a preferable structure for this method can be provided.

DETAILED DESCRIPTION OF THE PREFERRED EMBODIMENTS

By referring to attached figures, an embodiment of the present invention will be described.

Figure 1:
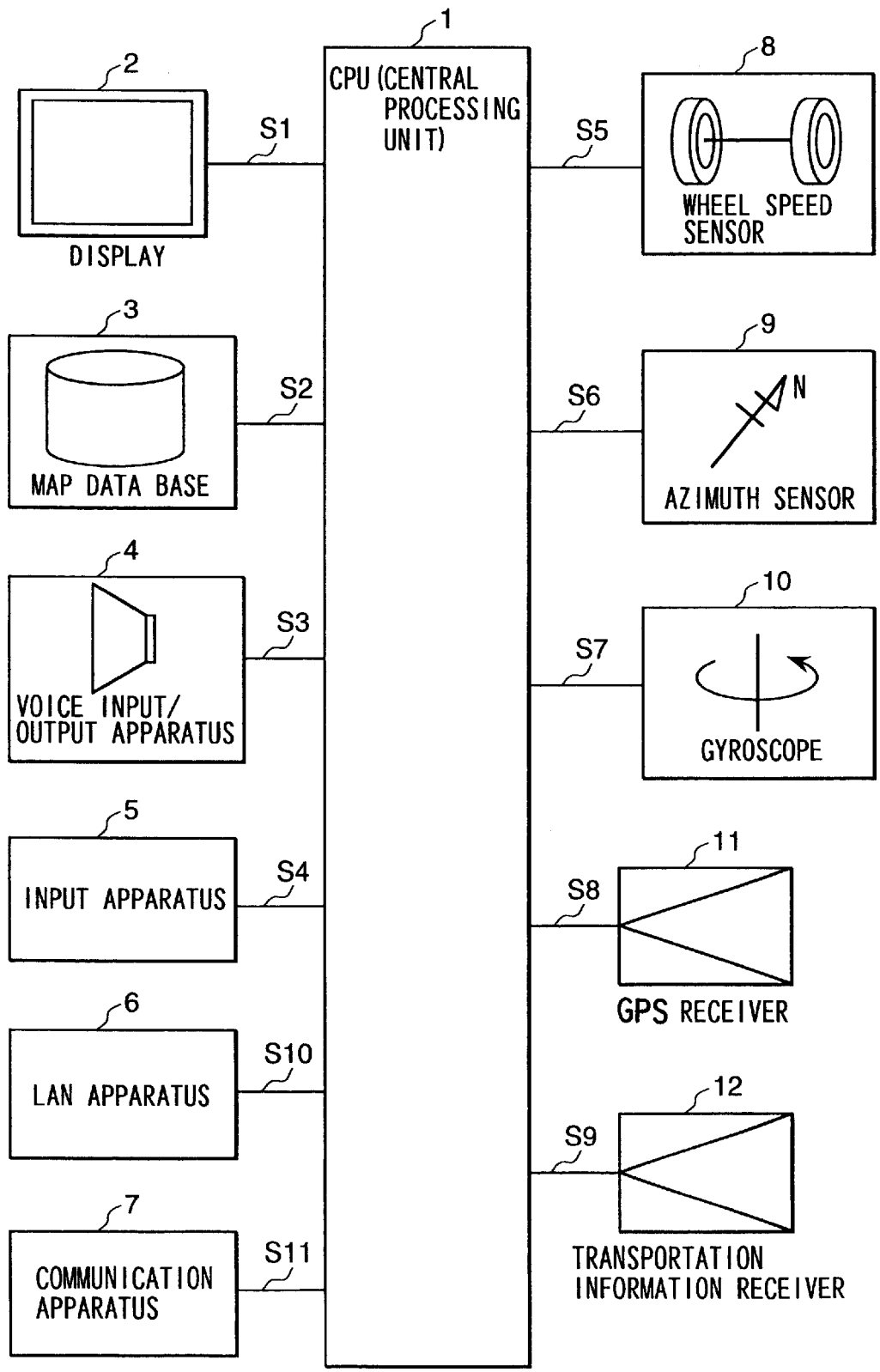
FIG. 1 is a block diagram showing an example of the structure of the navigation apparatus.

The component unit of the navigation apparatus of this embodiment is shown in FIG. 1.

The Central Processing Unit 1 is a central unit for performing various steps including those that detect the present position of the vehicle based on the information output from the individual sensors 8 to 11, and using the obtained present position information, read out the map information required for display from the map data base 3 and develops the graphical images, displays the present position of the vehicle as a current position mark detected from the sensors 8 to 11 onto the map developed graphically on the display 2, and that calculates an optimal path from the present position of the vehicle to the position specified by the user through the input apparatus 5 (for example, destination), and navigates the user with the driving path the destination through the voice input/output apparatus 4 and display 2.

The display 2 is a unit for displaying the graphic information generated by the central processing unit 1 and generally assembled with CRT or liquid crystal display. The signal S1 between the central processing unit 1 and the display 2 is generally established as RGB signal or NTCS (National Television System Committee) signal.

The map data base 3 is composed of mass storage media such as CD-ROM, IC card and DVD (Digital Video Disk), which performs steps for reading and writing required map data.

The voice input/output apparatus 4 transforms the message for the user generated by the central processing unit 1 into voice signals and outputs voice signals as well as recognizes the voice given by the user and transfer the recognized signal to the central processing unit 1.

The input apparatus 5 is a unit for accepting the user command and is composed of hand switches such as scroll key and scale-change key, joy stick and touch panel.

The sensors detecting the position of the vehicle for the movable object include a wheel speed sensor 8 for measuring the moving distance from the production of the circumference of the wheel and the number of revolutions of the wheel, an azimuth sensor 9 for detecting the travelling direction of the movable object by detecting the magnetic field held by the earth, a gyroscope 10 such as optical fiber gyroscope and vibration gyroscope for detecting the rotation angle of the movable object and a GPS receiver 11 for measuring the current position, traveling direction and traveling azimuth by receiving signals from the GPS satellite and measuring the distance and the rate of change of the distance between the movable object and the GPS satellite for three or more GPS satellites.

In addition, a transportation information receiver 12 is provided for receiving signals from Beacon transmitters and the FM multiple broadcast stations transmitting the real-time information such as traffic jams information, regulating information for road works and closed roads.

And furthermore, an in-car LAN apparatus is provided for receiving various vehicle-related information, for example, doors' open-close status, lights' on-off status, engine operation status and fault diagnosis information, and a communication apparatus 7 is provided for receiving user's request information, for example, information for restaurants and hotels at arbitrary locations, from the information center via communication with cellular phones or PHS's.

Figure 2:
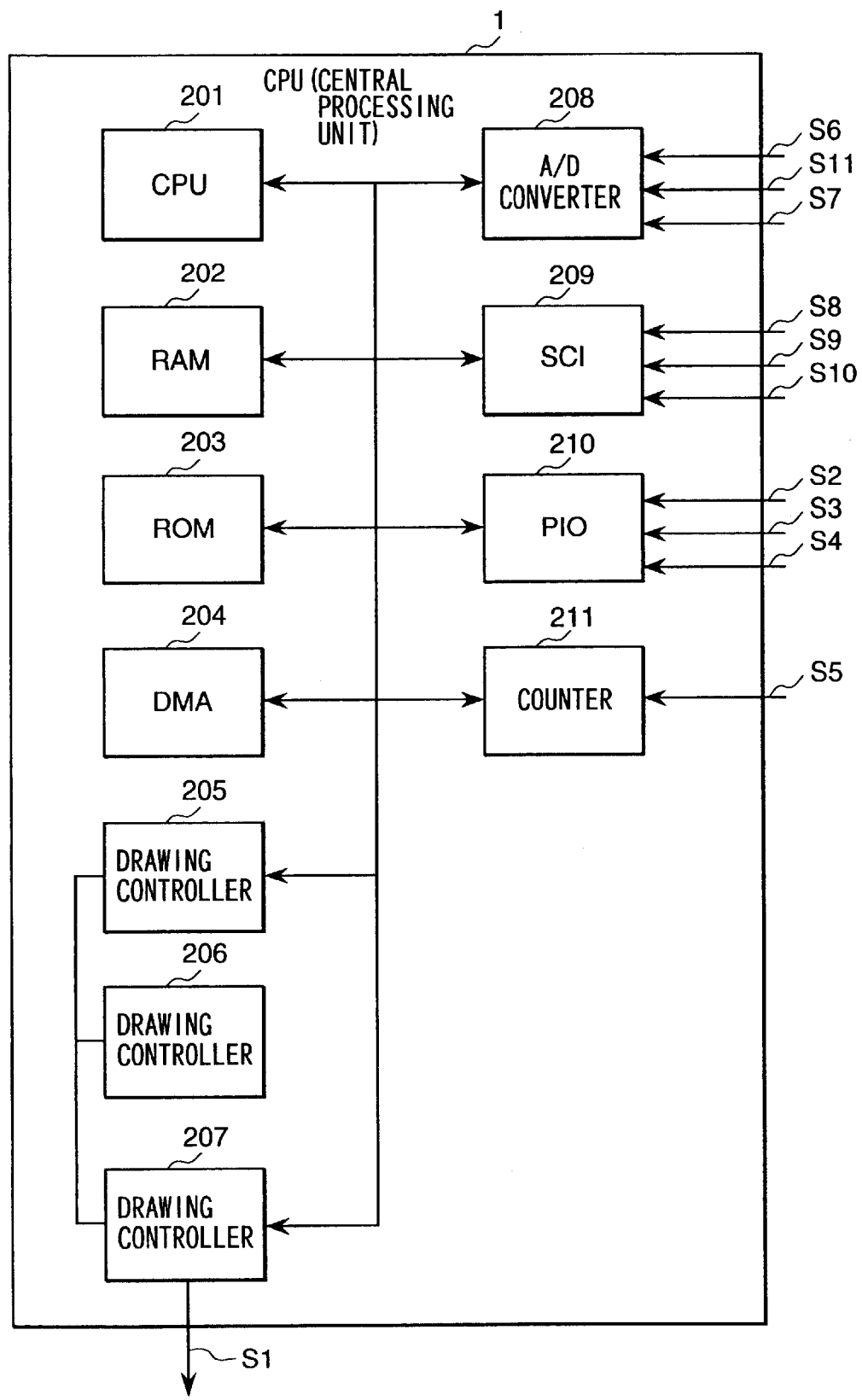
FIG. 2 is a block diagram showing an example of the hardware structure of the central processing unit.

A hardware configuration of the central processing unit 1 is shown in FIG. 2. The individual components will be described below.

The central processing unit 1 is configured so that the bus connects the individual devices to one another. The components include CPU 201 for executing various steps such as numerical calculation and device control, RAM 202 for storing temporarily map data and calculation data, ROM 203 for storing programs and data, DMA (Direct Memory Access) 204 for executing data transmission at a high speed between memories and between memories and the individual devices, VRAM 206 for storing the graphic image data obtained by developing the vector data into the pixel-by-pixel information, a drawing controller 205 for controlling the write-in operation for VRAM 206, a color palette 207 for transforming the image data to RGB signals, A/D converter 208 for converting analog signals to digital signals, SCI 209 for converting serial signals to parallel signals synchronized with the bus clock, PIO 210 for supplying signals onto the bus in synchronization with the parallel signals, and a counter 211 for integrating pulse signals.

Figure 3:
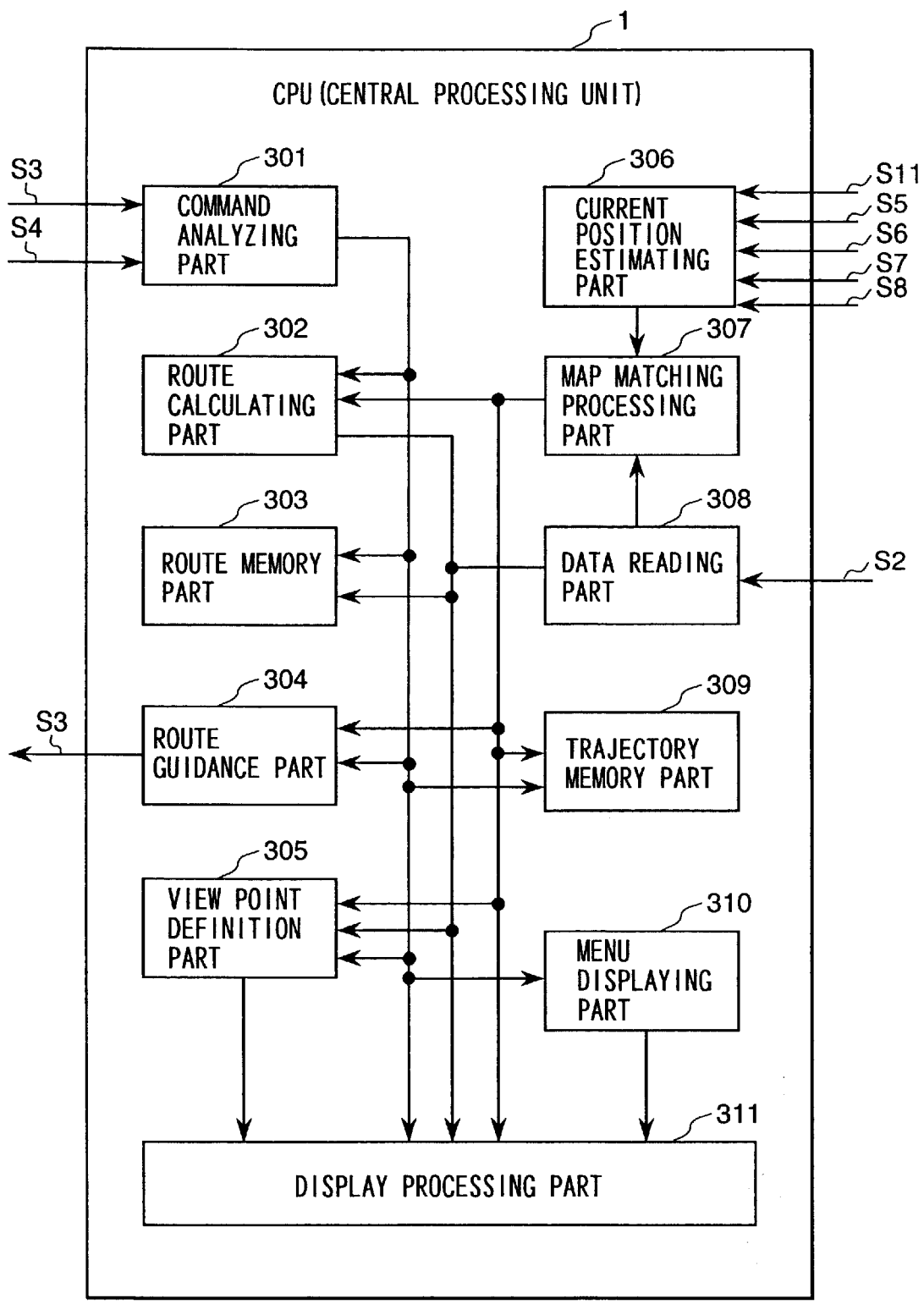
FIG. 3 is a block diagram showing an example of the functional structure of the central processing unit.

A functional structure of the central processing unit 1 is shown in FIG. 3. The individual components will be described below.

In the current position estimating part 306, by using the distance data obtained by integrating the distance pulse data measured by the wheel speed sensor 8 and the angular speed data obtained by integrating the angular speed data S7 measured by the gyroscope 10, the current position (X', Y') of the movable body after traveling from the initial position (X, Y) is calculated by integrating the distance data and the angular speed data on the time base.

In order to justify the relation between the rotating angle of the movable object and the traveling direction of the movable object, the absolute value of the traveling direction of the movable object is corrected with the azimuth data S6 obtained from the azimuth sensor 9 and the angle data obtained by integrating the angular speed data S7 measured by the gyroscope 10. As the error in the sensor is accumulated while integrating the data obtained from the above sensor, the accumulated error is cancelled with the position data S8 obtained from GPS receiver 11 in a certain period of time, and then the current position data are obtained.

As the current position data so obtained as described above contains the error of the sensor, map-matching step is performed by the map matching processing part 307 in order to increase the accuracy in the position data. This step is that the road data contained in the map around the current position read by the data reading part 308 and the traveling trajectory obtained by the current position estimating part 306 are compared each other, and the current position is mapped on the road having a route trajectory highly correlated to the traveling trajectory. By applying the map-matching step, in most cases, the current position is made located on the traveling road, which enables to display the current position information with high accuracy.

The current position information so obtained as described above is stored in the trajectory memory part 309 every time when the movable object runs in a designated distance. [The trajectory data are used for displaying the traveling trajectory on the roads in the displayed map corresponding to the actual roads on which the movable object has ran so far. ]

The command analyzing part 301 accepts the user's request from the input apparatus 5, analyses the request and controls the individual units so that the steps corresponding to the request may be performed. For example, when the user requires a route navigation to his or her destination, the command analyzing part demands a step for displaying a map for accepting the user's input for his or her destination to the display processing part 311 and demands a step for calculating a route from the current position to his or her destination to the route calculating part 302.

The route calculating part 302 searches a route between a couple of specified positions from the map data by using search method such as Dijkstra method and so on, and stores the search result in the route memory part 303. It is possible to obtain a route having a minimum distance between a couple of specified positions, a route with which the destination can be reached in a minimum period of time or a route with which the cost can be minimized.

The route guidance part 304 compares the current position of the vehicle obtained by the current position calculating part 306 and the map-matching processing part 307 with the link information of the navigation route stored in the route memory part 303, and announces to the user with voice generated by the voice input/output apparatus 4 whether the driver should go straight or turn right or left at the intersection in advance within a predetermined time before he or she arrives at the intersection, and/or marks the navigation direction on the map displayed on the display 2 and notify an adequate route to the driver.

The data reading part 308 operates so as to be ready for reading the map data containing the area required by the user from the map data base 3. The view point definition part 305 defines the view point, the visual line and the visual field angle used for developing a perspective map viewed in a designated direction with respect to the ground surface.

The display processing part 311 is a processing part for drawing a three-dimensional shape of the structure viewed from a designated position according to the method given by this embodiment, which receives the map data around the area required by the user for display from the data reading part 308 and develops an graphical images with the view point, the visual line and the visual field angle specified by the view point definition part 305 and the scale, the drawing method and the drawing azimuth specified by the command analyzing part 301 and other parts, and transfers the graphical image data to VRAM 206.

In responsive to the command provided by the command analyzing part 301, the menu displaying part 310 transfers various menus and symbolic marks required to be displayed to the display processing part 311 and establishes the super positioned display on the map.

Figure 4:
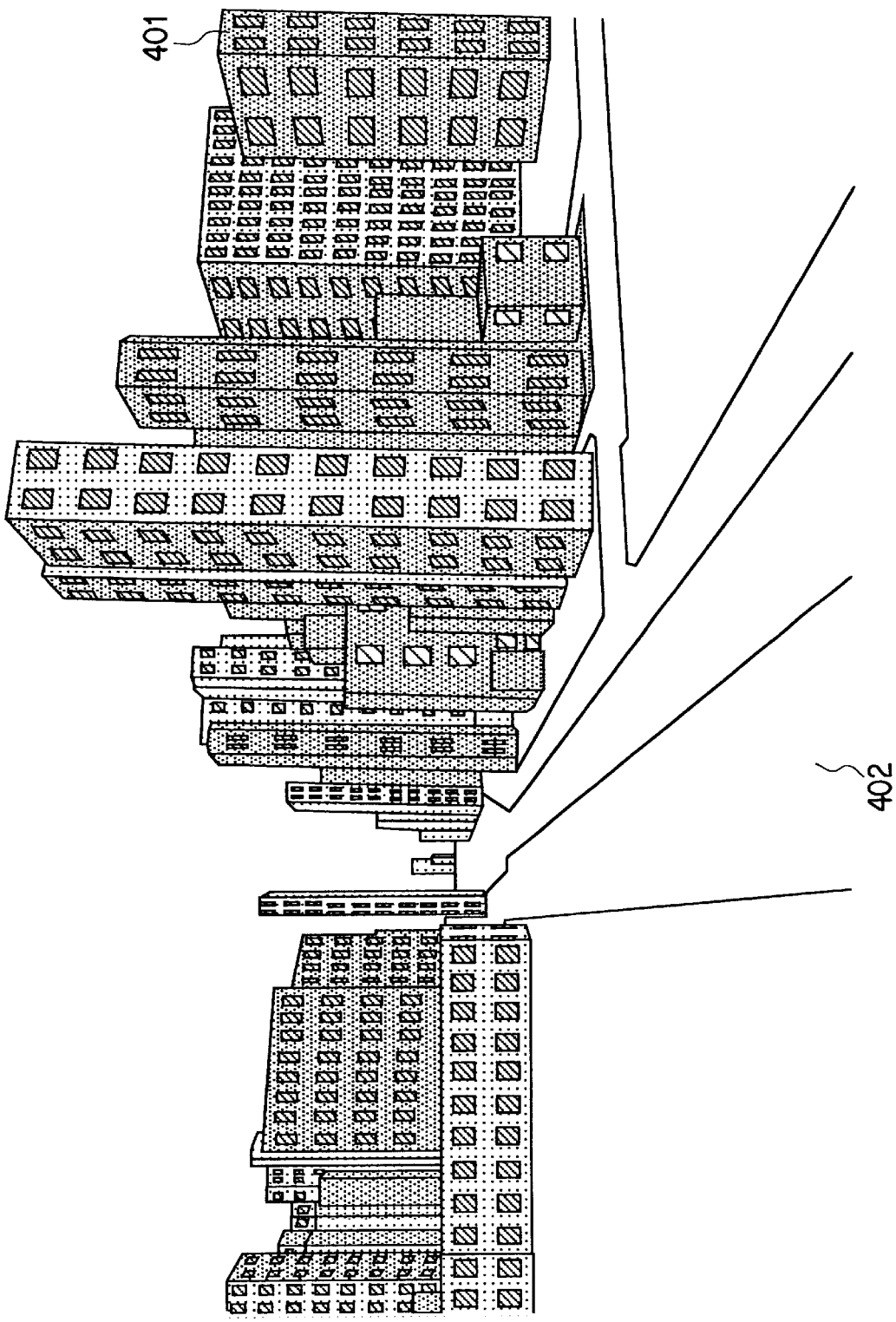
FIG. 4 is a schematic diagram showing an example of the display of the three-dimensional map obtained by applying the drawing processing in the present invention.

An example of displaying a three-dimensional map so developed that a part of the map information containing buildings and roads to be displayed on the display 2 and transferred to VRAM 206 by the display processing part 311 may be viewable from a designated view point is shown in FIG. 4.

The component 401 is a three-dimensional structure obtained by generating the three-dimensional data of the structure obtained from the two-dimensional data (bottom face data) of the buildings and residential houses and the height of the structure (or the height is estimated from the number of floors of the structure), both read from the map data base 3, and developing the graphical image to be displayed. A genuine-looking image of the structure can be expressed by mapping textures like windows on the side wall of the three-dimensional structure 402. The component 401 is a road. Though the height of the road is made equal to the level of the ground surface in this display example, in case of a cross way with an overpass or underpass in which the road information contains the height data, the road is displayed as a three-dimensional structure by generating a three-dimensional road data from the road height.

According to the drawing method of the present invention, even in case that the three-dimensional structure 401 is decomposed into plural units by the mesh boundaries in the map data base 3 and its data are stored unit by unit, it is allowed to join the decomposed units of the original three-dimensional structure together continuously at the mesh boundaries, and to display the three-dimensional structure 401 as a single body.

Figure 5:
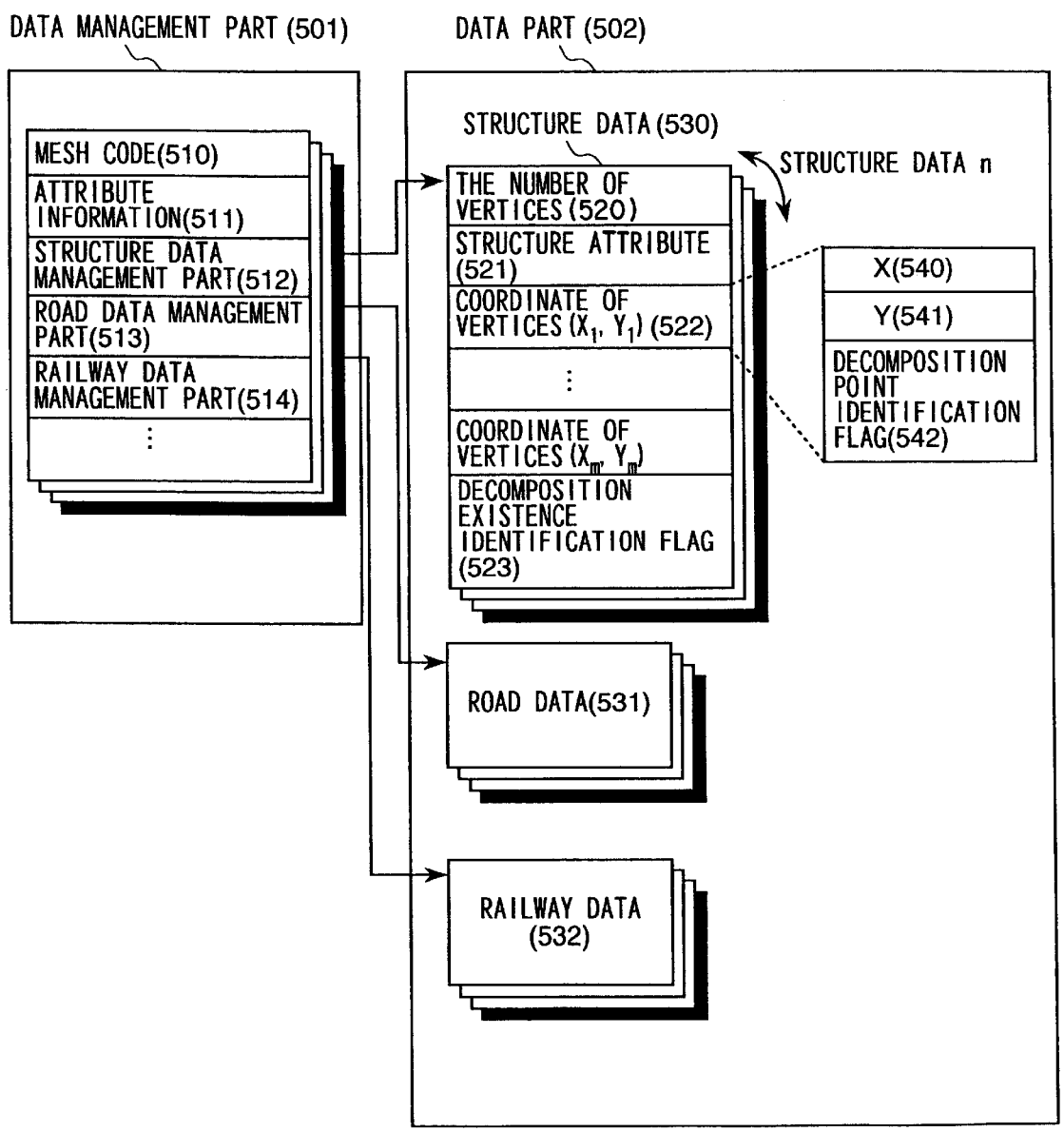
FIG. 5 is a schematic diagram showing an example of the data format in the map database.

An example of the data base structure of the map data base 3 used in the present invention is shown in FIG. 5.

As the size of the map data containing roads and buildings stored in the map data base 3 is very large, the map data are managed as a set of standard area meshes defined as units obtained by dividing the area with designated intervals for the latitude and the longitude.

An identification number designated "mesh code" is assigned to the individual area mesh. The map data are composed of the data management part 501 and the data part 502, and the data management part 501 contains an individual management table for the individual area mesh, and the individual management table stores the map information including the mesh code 510, the attribute information 511, the structure data management part 512, the road data management part 513, the railway data management part 514 and the other parts.

The attribute information 511 stores the scale of the map, the time stamp of the map data, and the map sheet name. The structure data management part 512 stores the link data to the structure data 530 and the size of the structure data, the road data 513 store the link data to the road data 531 and the size of the road data, and the railway data 514 store the link data to the railway data 532 and the size of the railway data.

The structure data 530 store, the number m of vertices contained in the structure 520, the structure attribute 521 containing the description of the structure such as residential house, gasoline station or hotel, the number of floors (or the height) of the structure and the name of the structure, the coordinates of the vertices 522, the decomposition identification flag 523 for judging whether the structure is a decomposition structure decomposed by the mesh boundaries, the link data 524 to the other decomposed data and the other data.

Though the link data defined between the individual decomposition data originated from the single-bodied structure are stored in the map data in this embodiment, the method for storing the data of the decomposition structure is not limited to this method in the present invention. For example, it is allowed to configure the method for storing the data as in the structure in which, in case that there is a decomposition structure in a certain mesh area, all or a part of the data of the other decomposition structure originated from the single-bodied structure identical to said decomposition structure and stored in the other mesh areas are stored in said mesh area.

The coordinate of vertices 522 stores X and Y coordinates normalized within the mesh, and the decomposition point identification flag 542 for judging whether said vertex is generated at the mesh boundary.

In this specification, vertices of the structure may contain interpolation points in case that there exist virtually some interpolation points defined for interpolating the vertices of the physical shape of the structure other than those physical vertices.

The road data 531 store the link information for linkages between cross ways (hereinafter referred to as node), the coordinates of nodes, the description of the road such as toll road and national highway, the height of the road and the other data. The railway data 532 store, the link information for linkages between branch points, the coordinates of branch points, the line name, the station name and the other data.

Figure 6:
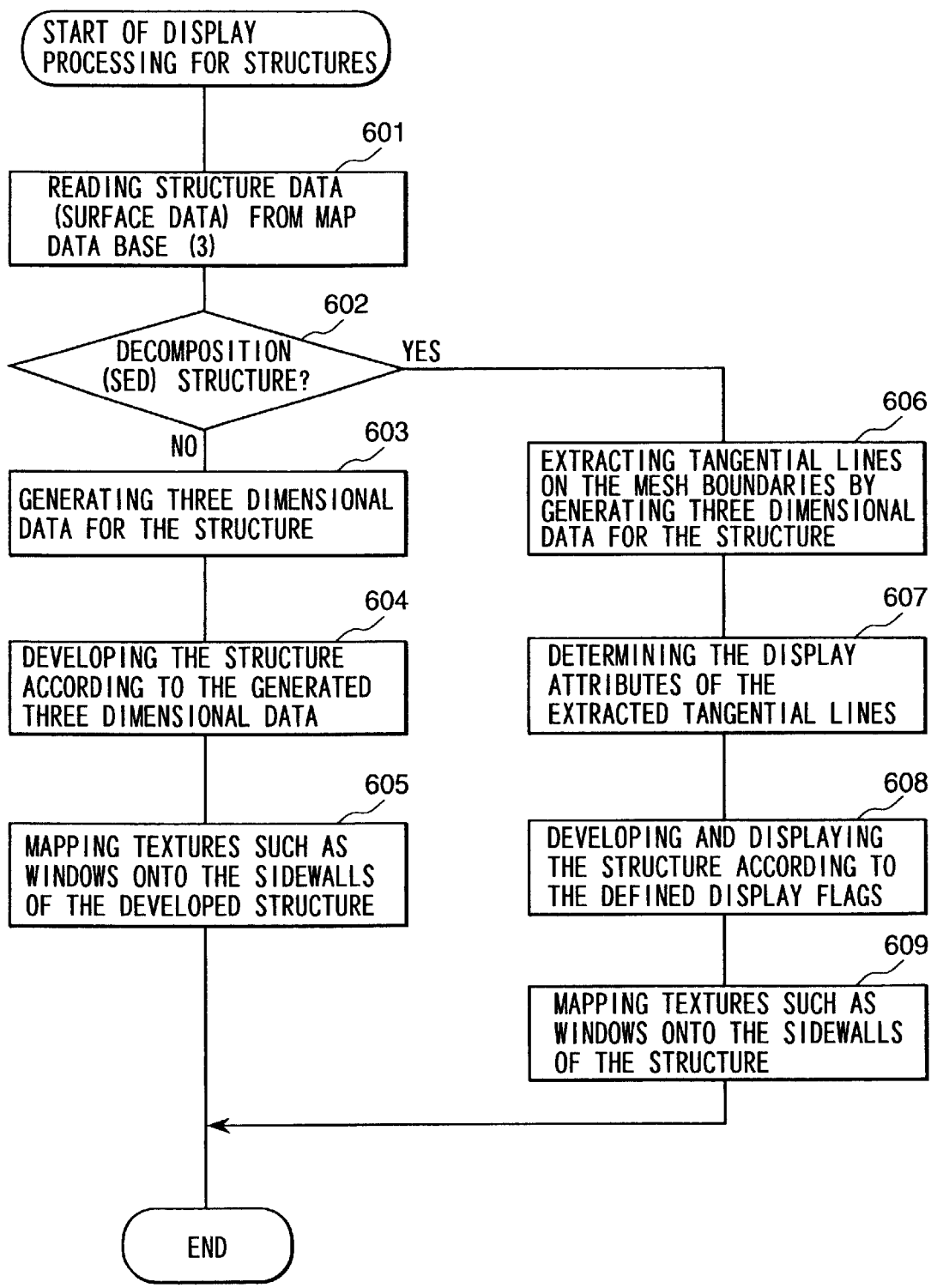
FIG. 6 is a flowchart showing an example of the procedure for structure drawing processing in the present invention.
Figure 7:
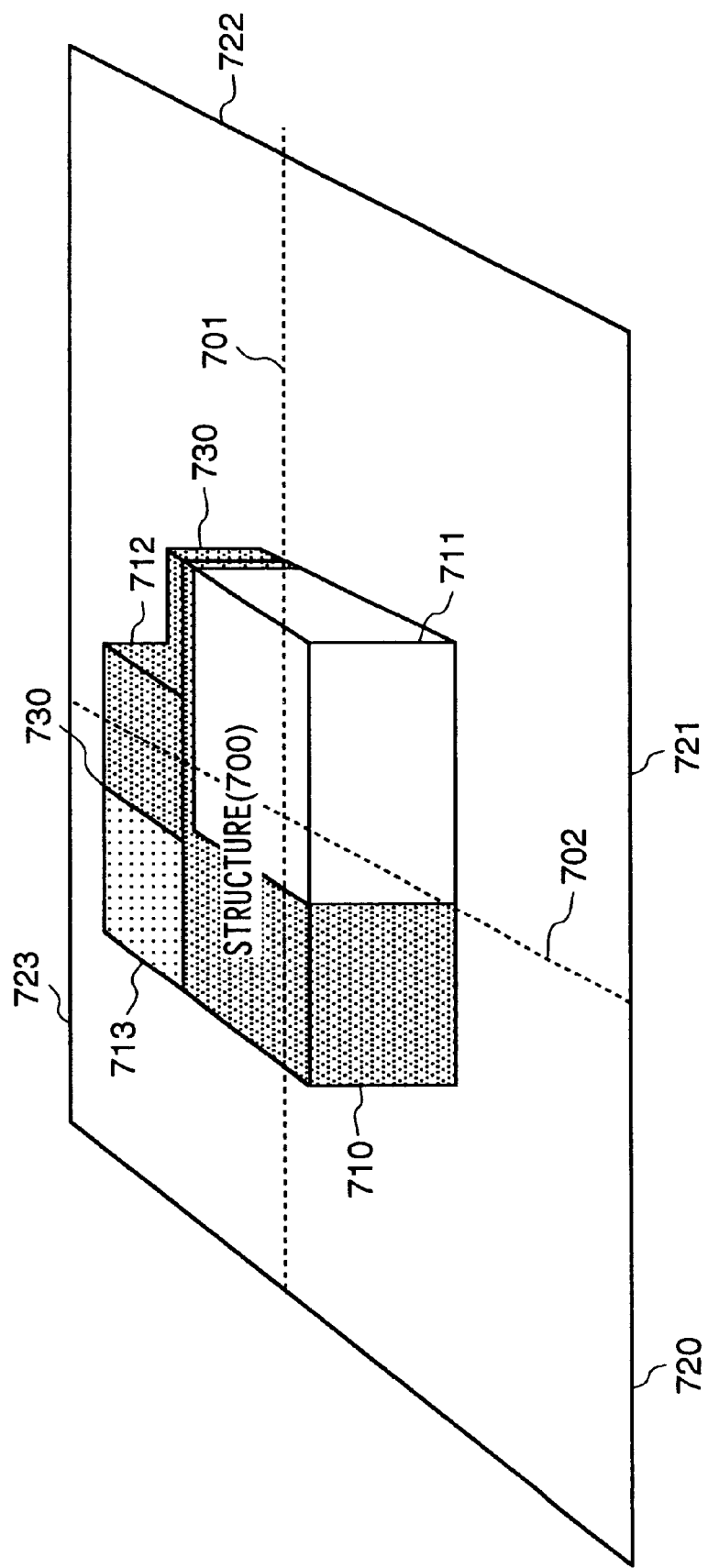
FIG. 7 is a schematic diagram for supplementary explanation for the procedure shown in FIG. 6.

An example of the step for drawing the structure in the display processing part 31 is described by referring to the flowchart shown in FIG. 6 and FIG. 7. FIG. 7 is a schematic diagram for supplementary explanation for this step. The drawing step is described below.

At first, in Step 601, the structure data are read in from the map data base 3 through the data reading part 308. In Step 602, by referring to the decomposition identification flag 523 of the read structure data, whether the structure data are decomposition data or not is judged.

In case of non-decomposition structure (that is, it is judged as No in Step 602, a three-dimensional shape of the structure is formed from the coordinates of vertices and the number of floors (or the height) of the structure in Step 603. By means of applying the view point coordinate transformation and the projection transformation to the formed three-dimensional shape, the three-dimensional shape is developed to the shape viewed from a designated view point in step 604. Finally, textures figured in walls and windows are mapped on the side wall of the developed structure in Step 605, and then, the step is terminated.

On the other hand, in case that it is judged that the structure is a decomposition structure in Step 602, the three-dimensional data of the structure is formed in the similar manner to that in Step 603, and the tangential line on the mesh boundary is extracted during the formation process in Step 606.

The step for extracting the tangential line on the mesh boundary is described by referring to FIG. 7. FIG. 7 shows a structure 799 existing over four meshes 720 to 723. The structure 700 is decomposed into four structures 710 to 713 by the mesh boundaries 701 and 702, and the decomposition structure 710 is stored and managed as data of the mesh 720, the decomposition structure 711 is stored and managed as data of the mesh 721, the decomposition structure 712 is stored and managed as data of the mesh 722, and the decomposition structure 713 is stored and managed as data of the mesh 723 in the map data base 3, respectively.

The step in Step 606 in FIG. 6, the closing line 730 of the decomposition surface of the structure 700 decomposed by the mesh boundary is extracted as a tangential line on the mesh boundary. The drawing attributes of the extracted tangential line including color, line style and pattern are defined to be transparent color, identical to the color of the side wall of the structure, tint lines or broken lines so that the tangential line may not be seen distinctly in Step 607, and then, the structure is developed and drawn according to the defined drawing attributes in Step 608. In Step 607, it is allowed to use such a method that the drawing attributes of the extracted tangential line is so defined to include pen-up with which the tangential line may not be drawn when pen-up is specified.

Finally in Step 609, textures having patters for walls and windows are mapped on the side wall of the developed decomposition structure, and then, the step is terminated.

It is necessary to perform Step 609 so that the textures may not be discontinuous near the mesh boundaries. The detail of this step is described later by referring to FIGS. 10 and 12.

Figure 8:
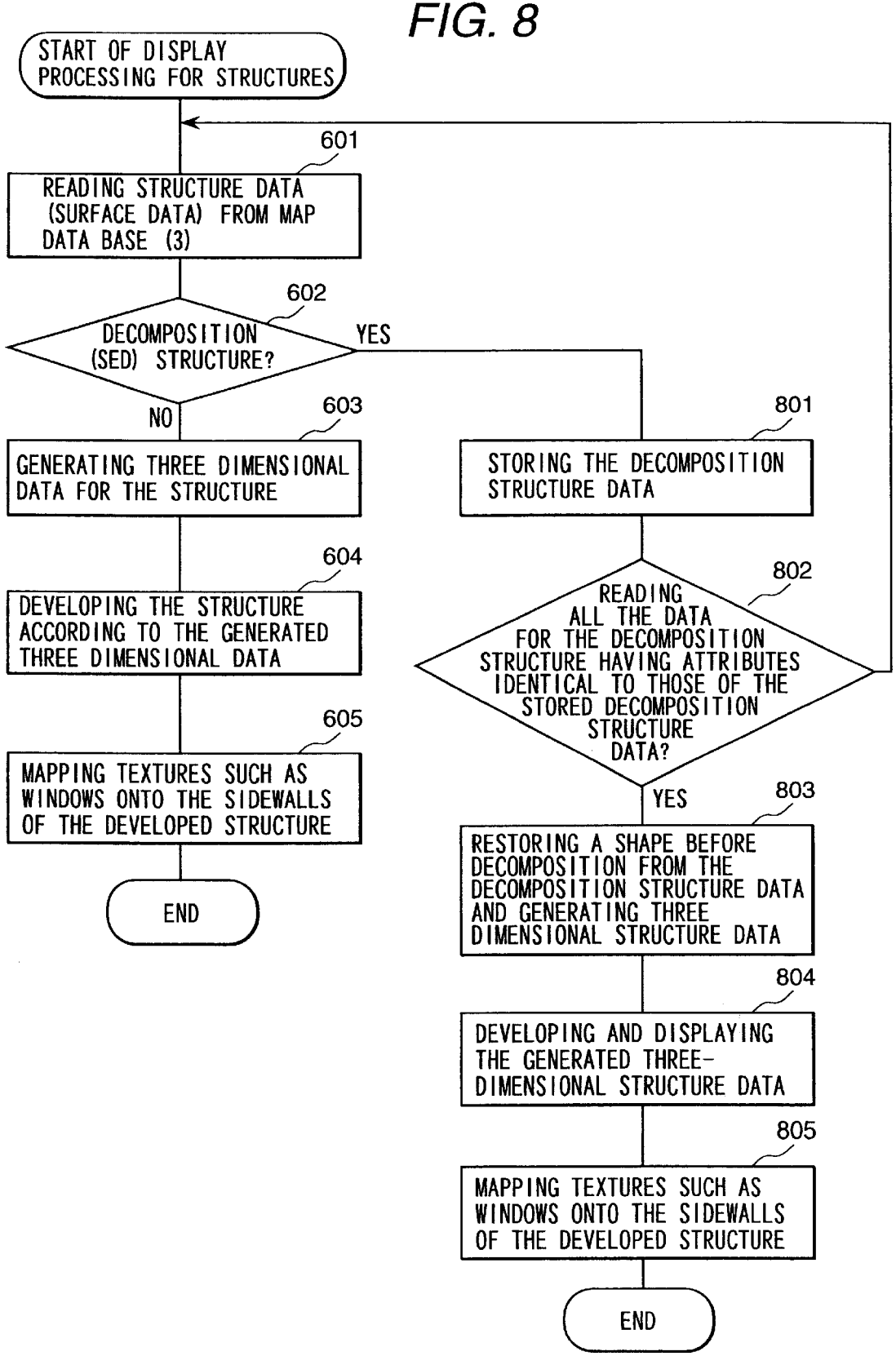
FIG. 8 is a flowchart showing an example of the procedure for structure drawing processing in the present invention.
Figure 9:
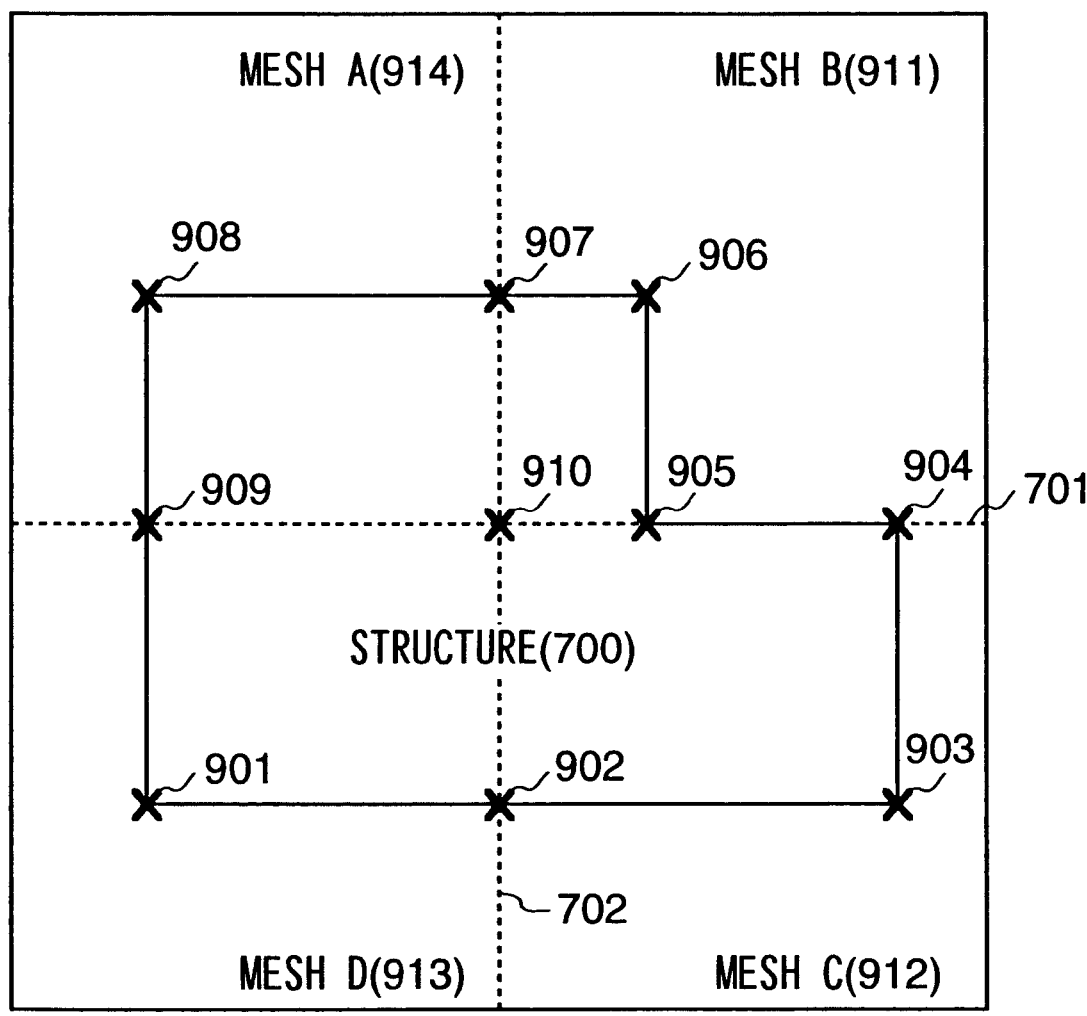
FIG. 9 is a schematic diagram for supplementary explanation for the procedure shown in FIG. 8.

Another example of the step for drawing the structure in the display processing part 311 is shown by the flowchart in FIG. 8, and FIG. 9. FIG. 9 is a schematic diagram for supplementary explanation for this step.

In case that the structure data read from the map data base is judged to be that of a non-decomposition structure, the steps from Step 601 to Step 605 similar to those in FIG. 6 are executed. On the other hand, in case that the structure is judged to be a decomposition structure in Step 602 in FIG. 8, the decomposition structure data are stored temporarily into RAM 202 in Step 801. The decomposition structure data are stored until all the data for other decomposition structures having attributes identical to the stored data of this decomposition structure, and when it is judged in Step 802 that the remaining decomposition data are read completely, the decomposition data before decomposition are reconstructed from the stored decomposition data in Step 803.

The reconstruction step in Step 803 is described by referring to FIG. 9. FIG. 9 shows bottom face data of the structure 700. The structure 700 is decomposed by the mesh boundaries 701 and 702, and its data are stored in the map data base 3. As the map is ordinarily read out sequentially and drawn mesh by mesh, at first, the vertices 909, 910, 907, and 908 are read when developing and drawing the mesh A 914, next, the vertices 910, 905, 906 and 907 are read when developing and drawing the mesh B 911, then, the vertices 902, 903, 904 and 910 are read when developing and drawing the mesh C 912, and finally, the vertices 901, 902, 910 and 909 are read when developing and drawing the mesh D 913.

In the reconstruction step in Step 803, in the drawing step for the mesh A 914, if the decomposition identification flag 523 for the map data indicates that the vertices data 909, 910, 907 and 908 forming the structure corresponds to a decomposition structure, those vertices data are stored. The decomposition data for the meshes B to D are read by the link 524 to the decomposition data, and the shape data vertices 901, 903, 904, 905, 906 and 908 of the structure 700 before decomposition is formed by the vertices 909, 910, 907 and 908, the vertices 910, 905, 906 and 907, the vertices 902, 903, 904 and 910, and the vertices 901, 902, 910 and 909.

According to the decomposition point identification flag 542 of themapdata, the vertices 902, 910, 907 and 909 are judged to be decomposition points existing on the mesh boundaries, and are excluded for drawing. Though the vertices 904 and 905 are located on the mesh boundary, according to the decomposition point identification flag 542, those vertices are judged not to be decomposition points but to be end points of the structure, and hence, those are included for drawing.

In this embodiment, the end points of the structure are considered only as vertices forming a structure before decomposition. In case that the points forming a structure include both of the vertices and the interpolated points, it is allowed to use such a structure that the decomposition point identification flag discriminates the points other than decomposition points from those vertices and interpolated points.

Finally, three-dimensional shape data are established from the bottom face shape defined with the points 901, 903, 904, 905, 906 and 908 of the formed structure 700 and the height (or the number of floors) of the structure.

In Step 804 of FIG. 8, b means of applying the view point coordinate transformation and the projection transformation to the three-dimensional shape formed in Step 803, the three-dimensional shape is developed into the shape viewed from a designated view point and drawn. Finally, textures figured in walls and windows are mapped on the side wall of the developed structure in Step 805, and then, the step is terminated.

Figure 10:
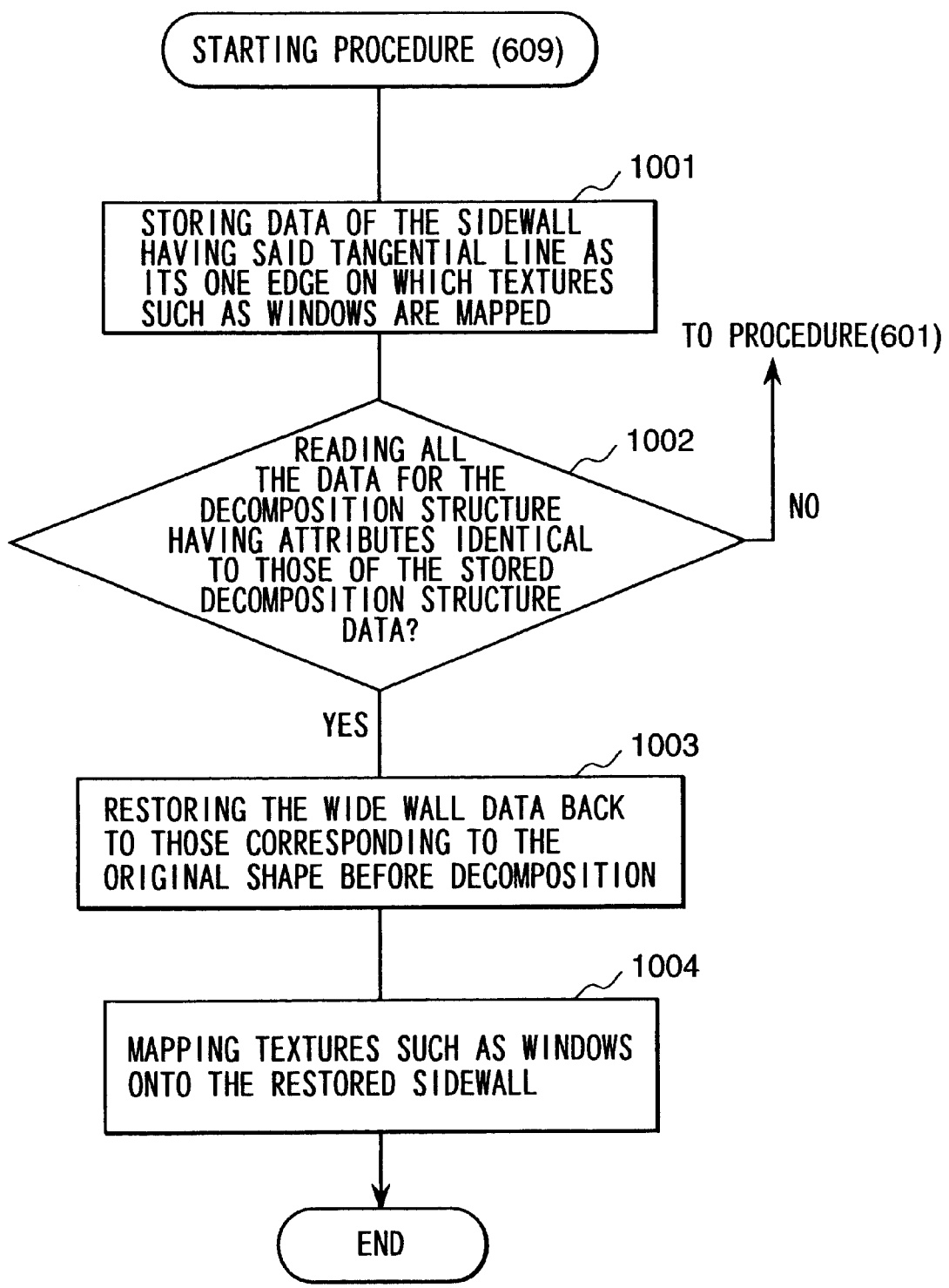
FIG. 10 is a flowchart showing an example of the step for mapping the texture on the side wall of the decomposition structure.
Figure 11:
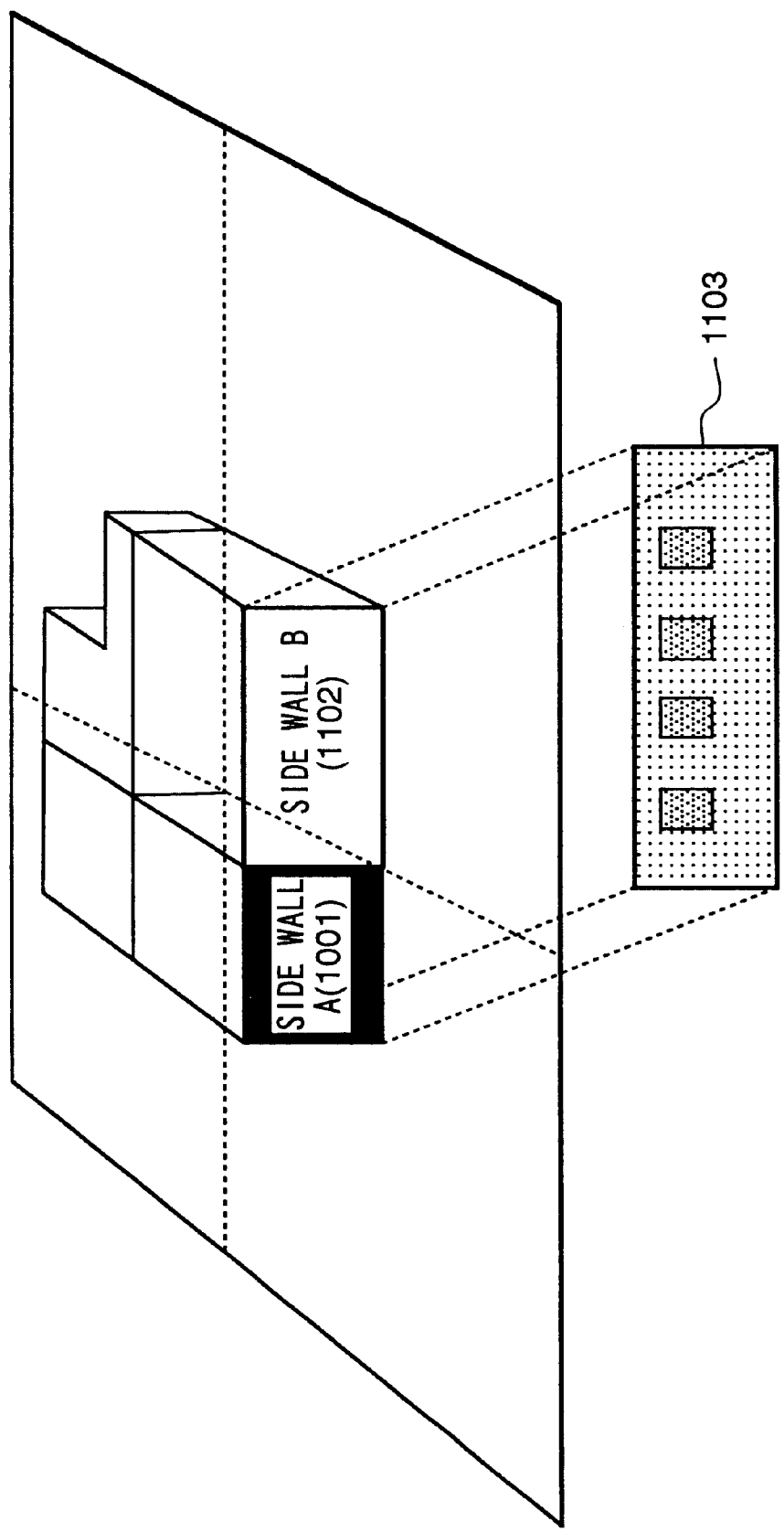
FIG. 11 is a schematic diagram for supplementary explanation for the procedure shown in FIG. 10.

An example of the step for mapping textures on the side wall of the developed and drawn decomposition structure executed in Step 609 of FIG. 6 is described by referring to FIGS. 10 and 11. FIG. 11 is a schematic diagram for supplementary explanation for this step.

In this step in Step 609, if textures such as windows are to be mapped on the side wall A 1100 read in the developing and drawing step for the mesh A, the data of the side wall A are stored in Step 1001, and next, when the data of the side wall B 1102 are read in Step 1002, the side wall 1103 before decomposition is reconstructed from the side walls A and B in the similar manner to the steps shown in FIG. 8 in Step 1003, and finally, textures such as windows are mapped on the reconstructed side wall 1003 in Step 1004.

Though a building having a single floor is shown as an example in this embodiment, it is allowed to use such a procedural structure that textures may be mapped on repetitively in the vertical and/or horizontal directions in the according to the number of floors and/or rooms of the building. As the buildings near the view point are drawn larger and those in the distance from the view point are drawn smaller in the perspective view, it is allowed to use such a procedural structure that textures are processed with scale conversion according to the sizes of the buildings. In addition, it is allowed to use such a method that the distortion in the mapped textures due to scale conversion may be reduced by selecting adequate textures for the size of the building from the plural textures prepared with different scales. Such methods for scale conversion of textures and for texture selection are generally used as those familiar to the skilled in the field of CG (Computer Graphics).

Figure 12:
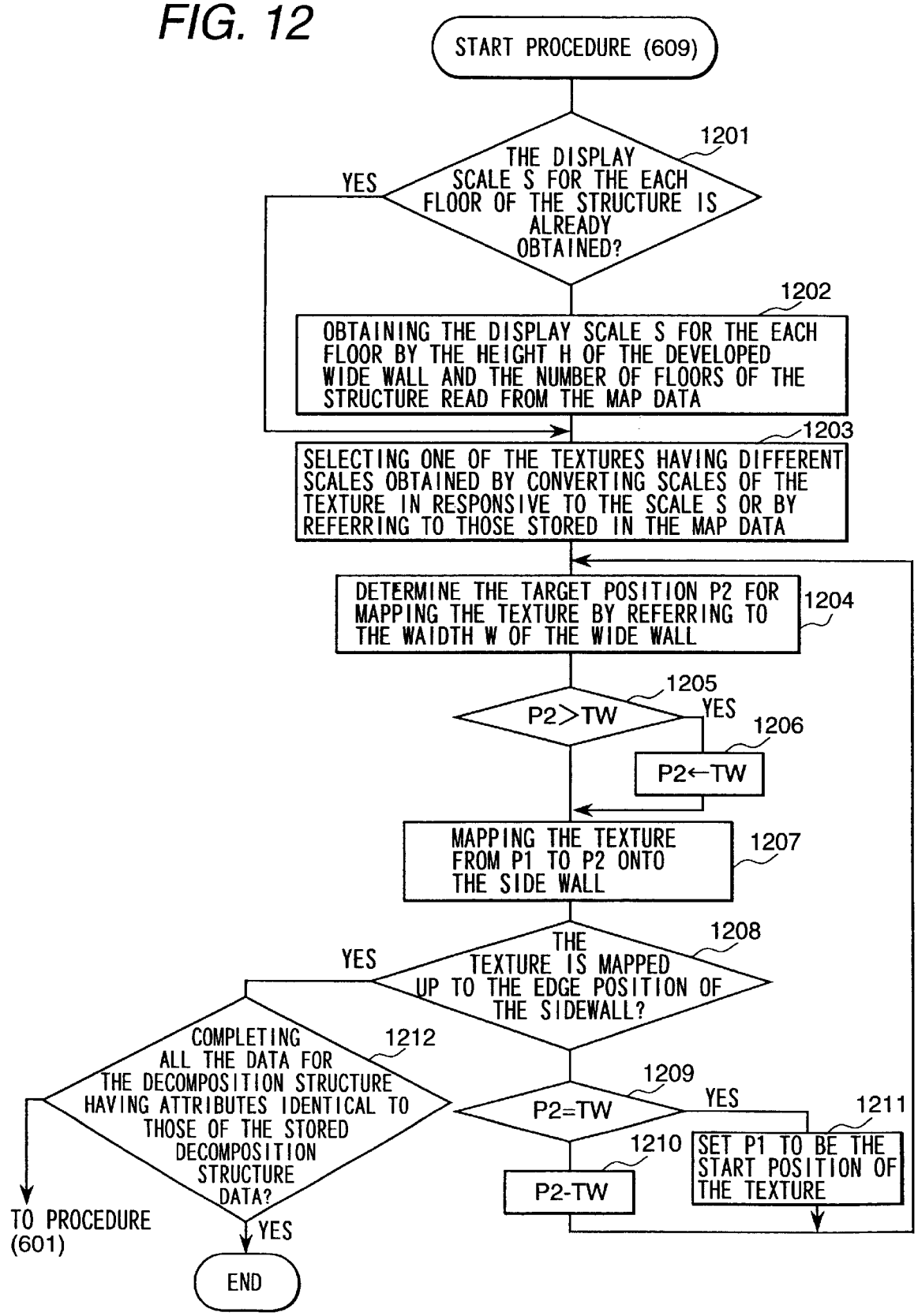
FIG. 12 is a flowchart showing another example of the procedure for mapping the texture on the side wall of the decomposition structure.
Figure 13:
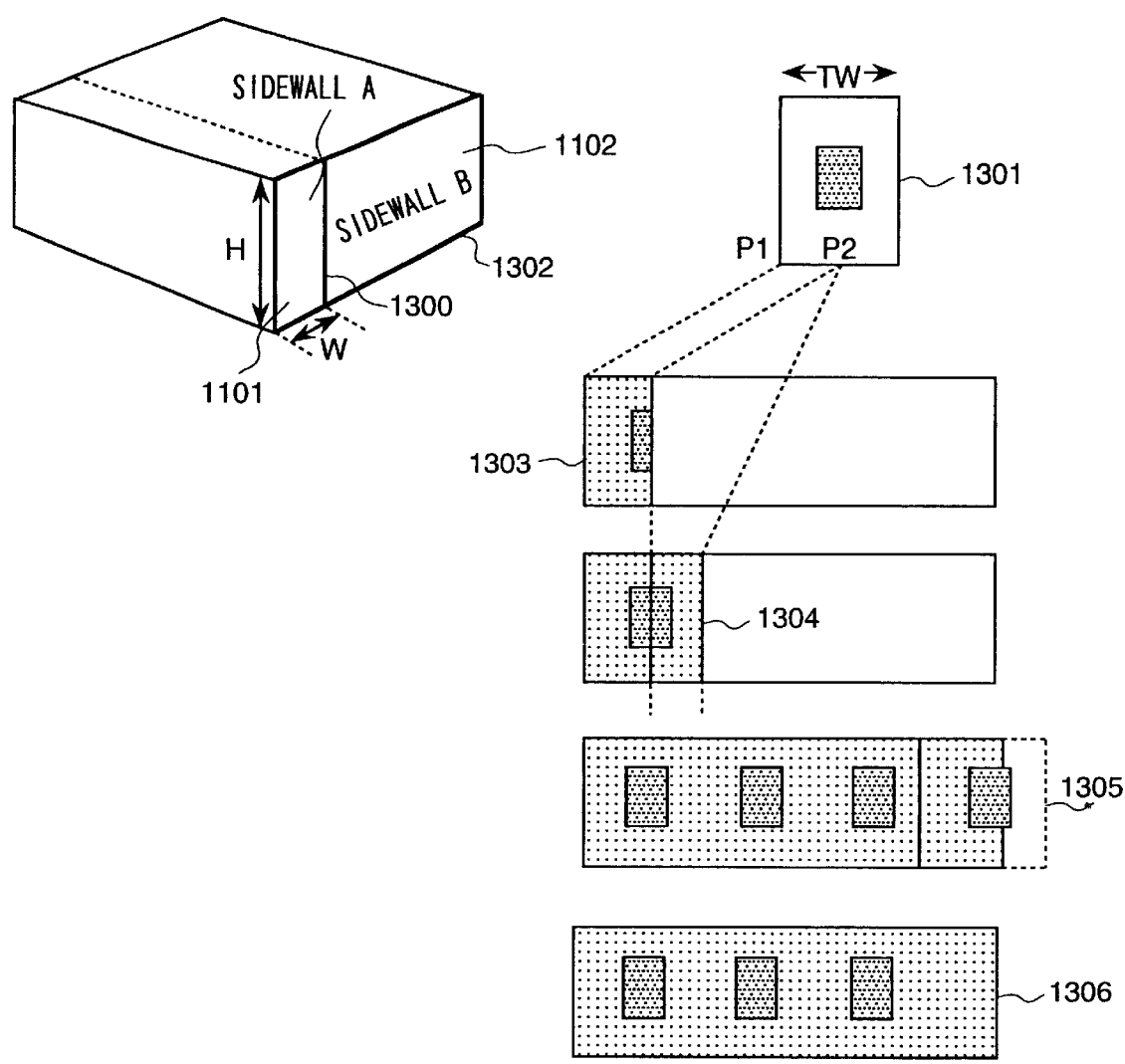
FIG. 13 is a schematic diagram for supplementary explanation for the procedure shown in FIG. 12.

Another example of the step in Step 609 shown in FIG. 6 for mapping textures on the side wall of the decomposition structure is described by referring to FIGS. 12 and 13. FIG. 13 is a schematic diagram for supplementary explanation for this step. The start point for developing the texture to be mapped on the side wall 1302 is defined to be P1 and its end point is defined to be P2. P1 and P2 are set on the top of the texture precedently. The side wall 1302 is composed of the side wall A 1101 and the side wall B 1102 defined by decomposition with the decomposition line 1300 corresponding to the mesh boundary line and the interpolated points. A step for mapping textures continuously onto those decomposed side walls and reproducing an uniform structure is described below.

Whether the drawing scale S per a single floor of the structure is already obtain is judged in Step 1201, and then, if it is not so, the scale S is calculated from the height H of the side wall 1302 and the number of floors of the structure in Step 1202.

Next, the texture 1301 are processed with scale conversion according to the scale S or by selecting a texture having an optimal size from textures scaled with various factors and stored in the map data precedently in Step 1203. The target position P2 on which the texture 1301 is to be mapped is determined according to the width W of the side wall A 1101 obtained by decomposing the side wall 1302 in Step 1204.

Whether P2 is larger than the width TW of the texture 1301 is judged in Step 1205, and if it is so, P2 is adjusted so as not to be larger than TW in Step 1206. The textures P1 and P2 are mapped on the side wall in Step 1207. For example, the mapped texture looks like the processed image 1303.

Whether textures are mapped up to the end position of the side wall is judged in Step 1208, and if the mapping operation is completed up to the end position, whether other decomposition data remain in Step 1212. If there are remaining decomposition data, the decomposition data of the sidewall (side wall B 1102) is read in Step 601, and discontinuity between adjacent decomposition structures at the mesh boundary can be reduced by applying repetitively the above steps using the same texture data to the decomposition data read additionally.

In case that it is judged that the mapping operation is not completed up to the end position of the side wall in Step 1208 (as shown in the processed image 1304), at first, whether P2 is located at the end position of the texture 1301 is judged in Step 1209. If P2 is located at the end position, P1 is set to be the top position of the texture in Step 1211, and if it is not so, the start position P1 is shifted to P2 in Step 1210, and then the steps 1204 and after are executed and textures are mapped on repetitively.

As shown in the processed image 1305, in case that it is judged that the texture to be mapped on is disconnected at the end position of the side wall, the step is terminated. The processed image when completing the step looks like the image 1306.

According to the three-dimensional drawing method of the present invention, with a couple of drawing steps for drawing decomposition structures and non-decomposition structures, and with a step for identifying whether the specified structure is a decomposition structure or not, if it is a decomposition structure, by means that the drawing attributes of the decomposition boundary are modified, the structure data are reconstructed based on the decomposition data, and that textures are mapped on the side wall of the structure so as to maintain the continuity at the boundary, a navigation apparatus can be provided in which the discontinuity in the drawn images at the mesh boundary may be reduced and more realistic townscape may be displayed.

What is claimed is:

1. A navigation apparatus, comprising:
   a map data base storing map information comprising structure data defining structures in terms of a decomposed grid comprising grid areas having a predefined size;
   a reader unit which reads map information from the map data base for display in a three-dimensional view;
   graphic analysis units which draw a decomposition structure formed by decomposing a single-bodied structure that exists in at least two grid areas, and a non-decomposition structure which does not exist in more than a single grid area;
   a data processor programmed to
       determine whether structure data contained in map information read from said map data base corresponds to a decomposition structure; and
       cause a graphic analysis unit to use plural sets of structure data originated from a single-bodied structure before decomposition among structure data determined to correspond to a decomposition structure, to draw plural decomposition structures corresponding to said structure data as a unified body, so as to reconstruct said single-bodied structure.

2. The navigation apparatus according to claim 1, wherein said map information includes data for determining if said structure data correspond to one of said decomposition structures.

3. A navigation apparatus, comprising:
   a map data base storing map information comprising structure data defining three-dimensional structures within a map area;
   a display unit; and
   a data processor which processes data contained in said map data base, and causes said display unit to display a visually readable representation thereof; wherein,
       said map data are projected into a perspective map which is viewed from a preset observation point along an observation axis forming a designated angle with ground surface;
       structures in the projected perspective map are drawn as three-dimensional figures; and
       structural walls corresponding to the three-dimensional figures and facing the preset observation point in said perspective map are depicted including texture of said structural walls.

4. The navigation apparatus according to claim 3, wherein texture includes a depiction of windows on said structural walls.

5. A method of displaying navigational map information, comprising:
   reading map data comprising structure data defining three-dimensional structures within a map area, from a data base storing said map data; and
   displaying said map data in a visually observable form; wherein
       said map data are projected into a perspective map which is viewed from a preset observation point along an observation axis forming a designated angle with ground surface;
       structures in the projected perspective map are drawn as three-dimensional figures; and
       structural walls corresponding to the three-dimensional figures and facing the preset observation point in said perspective map are depicted including texture of said structural walls.

6. The navigation apparatus according to claim 5, wherein texture includes a depiction of windows on said structural walls.

7. A navigation apparatus having at least a means for reading a map information from a map data base storing a map information of a structure in terms of a decomposed mesh having a predefined size and displaying in a three-dimensional view,
   comprising a couple of drawing means for drawing a decomposition structure formed by decomposing a single-bodied structure existing over plural mesh areas and a non-decomposition structure which does not exist over plural mesh areas; and an identifying means for identifying whether structure data contained in said structure information read from said map data base corresponds to said decomposition structure, wherein said drawing means for drawing a decomposition structure uses plural sets of structure data originated from an identical single-bodied structure before decomposition among structure data which are judged to correspond to said decomposition structure by said identifying means, and draws plural decomposition structures corresponding to said structure data as a unified body so as to reconstruct said single-bodied structure.

8. A navigation apparatus of claim 7, wherein said map data base stores data for identifying said structure data to correspond to one of said decomposition structures.

9. A storage medium used for displaying a map by a computer and storing a map data containing a map information formed in terms of a decomposed mesh having a designated size, wherein said map data stores structure data corresponding to a decomposition structure formed by decomposing an originally single-bodied structure existing over plural mesh areas in terms of each mesh area;

structure data corresponding to a non-decomposition structure existing on a single mesh area; and identification data used for identifying whether each of said structure data corresponds to said decomposition structure.

10. A storage medium of claim 9, wherein said map data stores either of link data for linkage among plural structures corresponding to plural decomposition structure originated from an identical single-bodied structure before decomposition; or decomposition point identification data for identifying whether each of a set of points for defining a shape of said decomposition structure is a decomposition point defined newly by a decomposition step in terms of said mesh area.

11. A map display method, in which a map is decomposed into a mesh area having a predefined size, and from a map data base storing information representing a structure existing in an individual mesh area with respect to said individual mesh area, information representing said structure is read, and a perspective map viewed in a predefined angle with respect to a ground surface is displayed with a coordinate transformation, said method comprising:

a decomposition structure drawing step for drawing a single-bodied structure before decomposition by using an information defined when a structure originally formed as a single body existing over plural mesh areas of said map data base is decomposed for individual mesh areas, and representing a decomposition structure stored so as to correspond to each of said plural mesh areas;

a non-decomposition structure drawing step for drawing a non-decomposition structure, which does not exist over plural mesh areas; and an identifying step for identifying whether said structure information read from said map data base corresponds to said decomposition structure;

wherein said decomposition structure drawing step uses plural sets of structure formation originated from an identical single-bodied structure before decomposition which is judged to correspond to said decomposition structure by said identifying step; and draws plural decomposition structure corresponding to said plural sets of structure information as a unified body so as to reconstruct said single-bodied structure before decomposition.

12. A map display method of claim 11, wherein in said decomposition structure drawing step, a closing line of a side wall forming said decomposition structure is drawn such that it does not establish a decomposition surface of a decomposition structure formed by decomposing said single-bodied structure and existing on a boundary between said mesh areas.

13. A map display method of claim 11, wherein in said decomposition structure drawing step, when drawing a closing line of a side wall forming said decomposition structure, whether said closing line is a tangential line forming a decomposition surface of a decomposition structure formed over a boundary between said mesh areas; and if said closing line is judged to be said tangential line, said tangential line is drawn in a display mode different from that used for a closing line judged not to be a tangential line, but with less visual attractiveness.

14. A map display method of claim 11, wherein an information representing said decomposition structure includes at least an information indicating the number of vertices forming said decomposition structure;

in said decomposition structure drawing step, whether a vertex forming said decomposition structure exists on a boundary between said mesh areas is judged;

if said vertex is judged to be one located on said mesh boundary, whether said vertex is an end point of said decomposition structure is judged;

an identical single-bodied structure from which said decomposition structure is originated is drawn, by using a vertex which is judged to be an end point located on said mesh boundary and a vertex which is not located on said mesh boundary.

15. A map display method of claim 11, wherein an in formation representing a side wall of said single-bodied structure is reconstructed by using an information of individual side walls of plural decomposition structures originated from an identical single-bodied structure before decomposition; and a predefined texture is mapped on a side wall of said reconstructed single bodied structure.

16. A map display method of claim 11, wherein in said decomposition structure drawing step, a texture shaped in a predefined size is mapped continuously on individual side walls of plural decomposition structures originated from an identical single-bodied structure before decomposition.

* * * * *